United States Patent [19]

Hatchett

[11] 3,961,177
[45] June 1, 1976

[54] AUTOMATIC FOCUSING OF OPTICAL IMAGES

[75] Inventor: Jerry L. Hatchett, Xenia, Ohio

[73] Assignee: Goodyear Aerospace Corporation, Akron, Ohio

[22] Filed: July 31, 1974

[21] Appl. No.: 493,282

[52] U.S. Cl............................ 250/201; 250/204; 250/233; 353/101
[51] Int. Cl.² ............................................ G01J 1/36
[58] Field of Search ............ 250/201, 204, 233, 234; 356/4, 5, 126; 353/101

[56] References Cited
UNITED STATES PATENTS

| | | | |
|---|---|---|---|
| 2,838,600 | 6/1958 | Salinger | 250/201 X |
| 2,999,436 | 9/1961 | Faulhaber | 178/7.2 X |
| 3,783,269 | 1/1974 | McConnell | 250/201 |
| 3,856,407 | 12/1974 | Takeda et al. | 250/201 X |

*Primary Examiner*—Eugene La Roche
*Attorney, Agent, or Firm*—Oldham & Oldham

[57] ABSTRACT

Disclosed is a device for automatically focusing optical images wherein a rotating transparent disk having at least two sections of different focus delay characteristics is operative to pass a portion of an image carrying beam therethrough and onto a photoconductor. Output signals from the photoconductor are indicative of the degree of image clarity of the light incident thereto and these signals are passed to signal detector circuits wherein the signal resulting from light passing through the first section of the disk are compared with those signals resulting from light passing through the second section. The comparison of these signals is indicative of the degree of focus of the light beam and an error signal corresponding thereto is created from the outputs of the signal detector circuit.

7 Claims, 4 Drawing Figures

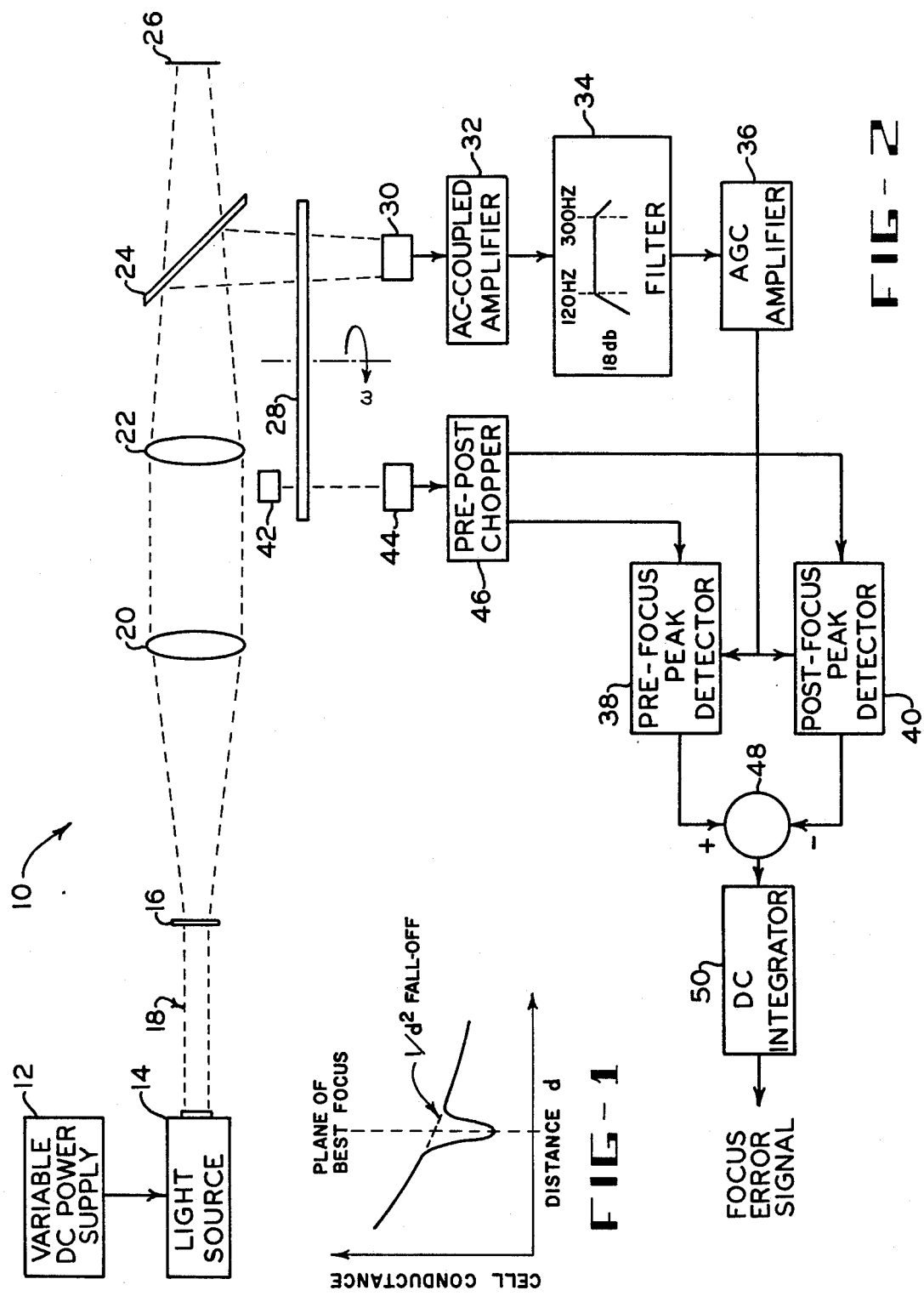

AUTOMATIC FOCUSING OF OPTICAL IMAGES

BACKGROUND OF THE INVENTION

Heretofore in the field of image focusing devices and techniques, it has generally been required that several complex and expensive photodetectors be utilized in combination with beam splitters so as to form several images from a single projected image and make comparisons of the several images to achieve proper focusing. Such apparatus and techniques are shown in U.S. Pat. No. 3,450,883.

It has further been known that a photoconductive element may be utilized in an automatic focusing system to control the focusing adjustment thereof as a function of the conductivity of the photoconductive element; such conductivity being a function of image clarity. The characteristic relationship between the conductivity of a photoconductive element and image clarity is well known in the art and clearly related in U.S. Pat. No. 3,562,785. However, this patent again incorporates a complex electromechanical structure to achieve the focusing technique while utilizing the benefits of the relationship between conductivity and focus.

Consequently, it is an object of the present invention to present a technique and structure for achieving the automatic focusing of optical images wherein a single inexpensive detector is necessitated.

Yet another object of the invention is to present an automatic focusing device wherein a single simple rotating disk utilized in conjunction with a minimum amount of electronic circuitry achieves the focusing technique.

Still a further object of the invention is to present such an automatic focusing device having short response times to change its focus conditions.

A further object of the invention is to present an automatic focusing device wherein the output of the device can easily be adapted to many optical focusing applications.

Yet another object of the invention is to present an automatic focusing device which is simplistic in design, inexpensive to construct, reliable in operation, and conducive to construction with state of the art elements.

These objects and other objects which will become apparent as the detailed description proceeds are achieved by an image projection system having a light source for projecting an image bearing beam upon an image plane, the improvement of an automatic focusing device, comprising a photoconductor receiving a portion of the light beam and creating signals indicative of image clarity; a focus delay plate interposed between the projection system and the photodetector and altering the distribution of the light incident to the photoconductor in a predetermined manner; and circuit means connected to the photoconductor and responsive to the signals of the photoconductor to create error signals indicative of the degree of focus of the light beam image.

For an appreciation of the structure and techniques of the invention reference should be had to the following detailed description and accompanying drawing wherein:

FIG. 1 is a graphical showing of the variation of the conductivity of a photoconductive element as a function of conditions of focus;

FIG. 2 is a schematic block diagram of the electromechanical structure of the invention;

Figure 3:
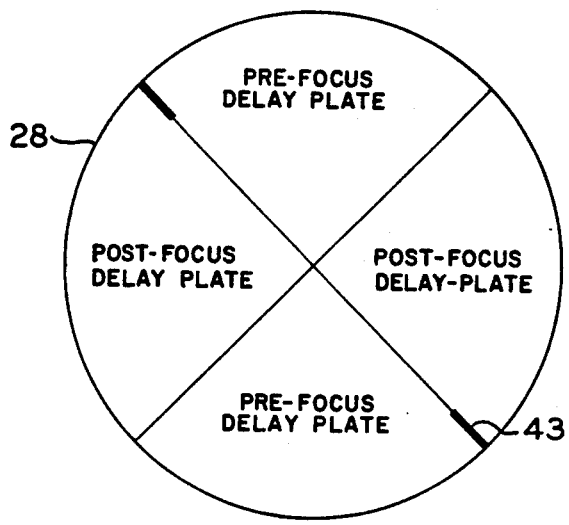
FIG. 3 is a plan view of the pre-post disk utilized in the invention.

This invention utilizes a peculiarity of photoconductive cells such as cadmium selenide and cadmium sulfide cells wherein the conductivity thereof varies as a function of the amount of light incident thereon. Further, such cells are known to vary in conductivity in relation to the distribution of light incident thereto even when the aggregate of such light remains constant. It has been found that the conductivity of such cells change abruptly, as shown in FIG. 1, at the plane of best focus when the cell is moved through the focal plane of a projected image. While many theories have been presented to explain this phenomena, the reason for such a falloff of the curve is not necessary for an appreciation of the invention described herein but the existence of such a phenomena is all that need be recognized.

Referring now to FIG. 2, it can be seen that the numeral 10 generally designates an automatic focusing device utilizing a photoconductive element having the characteristics described hereinabove with respect to FIG. 1. The device 10 incorporates a variable DC power supply 12 operatively connected to a light source 14 which may be of any suitable nature but which, for purposes of discussion, is presented as being an ordinary slide projector. The light source 14 emits a characteristic light beam 18 which is cast upon an object plane 16 which, for purposes of discussion herein, is assumed to be a photographic transparency or the like. It will of course be readily appreciated that the object plane 16 may comprise either a stationary or moving object and the image can similarly be either a homogeneous bar pattern or a non-homogeneous scene. In other words, the object plane 16 may comprise any of numerous types of elements including, but not limited to, slide or moving film transparencies.

The light passing through the object plane 16 and bearing information characteristic of the information stored within the object plane is then processed by the combination of photographic lenses 20, 22 in the ordinary manner. The lenses 20, 22 are standard in the art and may be of any suitable nature and the particular characteristics thereof are not necessary for an appreciation of the structure of the instant invention.

The processed light beam leaving the exit lens 22 is then cast into a beam splitter 24 which again may be of any suitable nature. In the preferred embodiment as shown, the beam splitter 24 is a 50/50 splitter dividing the beam from the lens 22 between an image plane 26 and a light transmissive plate 28. Of course, the beam splitter 24 need not be a 50/50 splitter but may have any of numerous splitting characteristics and the image plane 26 may comprise any suitable screen or the like depending upon the particular object to be achieved.

The beam splitter 24 casts a portion of the image-bearing beam from the exit lens 22 through the rotating light transmissive plate 28. As can best be seen in FIG. 3, the plate 28 is divided into quadrants, two quadrants being designated as pre-focus sections and the remaining two being designated as post-focus sections. As will become apparent, the plate 28 could equally well be divided into halves or alternating pre-focus and post-focus octants. The light transmission through the various quadrants of the disk 28 are identical but the thicknesses of the quadrants are different, as will be brought out later. Light passing from the beam splitter 24 and through the disk 28 is cast upon an appropriate photoconductive element 30 as described hereinabove with respect to FIG. 1. Preferably, the photoconductor 30 comprises a CdSSe detector as is well known in the art. It will of course be appreciated that any photoconductive cell that varies in conductance as a function of image detail may be utilized. An electrical signal, varying as a function of the image detail is emitted from the element 30 and transferred to an AC coupled amplifier 32 which functions in the normal manner. The output of the amplifier 32 is preferably passed to a filter 34 which is tuned to eliminate those detector output changes which might be caused by brightness variations of a moving object film. Of course, if the object plane 16 is stationary then the filter 34 may be eliminated. In any event, the signal is then passed to an automatic gain control amplifier 36 which, as is well known in the art, is operative to vary the gain or amplification of the signal incident thereto in inverse proportion to the strength of that signal. The output of the amplifier 36 is fed, in parallel, to pre-focus and post-focus peak detectors 38,40. Any appropriate peak detector may be utilized for achieving the objects of the element 38,40 and, as is well known in the art, such devices store information indicative of the highest level of a signal incident thereto during any particular time interval as controlled by the apparatus to be discussed directly hereinafter. The elements 38,40 could readily be replaced with magnitude or square law detectors and still achieve the objects of the invention.

The rotational speed of the disk 28 is synchronized with a pre-post chopper 46 which is operative to preset, in a mutually exclusive manner, the peak detectors 38,40. The chopper-detector combination comprises a type of synchronous demodulator as is well known in the art of map-matching and radar systems. Synchronization between the pre-post chopper 46 and the disk 28 is readily achieveable by means of an appropriate servo motor connected therebetween as is well known in the art. A DC light source 42 positioned opposite a photodiode 44 with the disk 28 rotating therebetween is utilized for purposes of creating synchronization pulses to maintain the chopper 46 in sync with the disk 28. Markers 43 are present in a diametrically opposed manner on the disk 28 and are of such nature as to momentarily inhibit the light flow from the source 42 to the diode 44 as the disk rotates in its normal fashion. Consequently, in each rotation of the disk 28 two sync pulses are created for purposes of maintaining synchronization between the disk 28 and the chopper 46. The synchronization technique is well known and understood by those skilled in the art.

As was mentioned hereinabove, the light transmission through the four quadrants of the rotating disk 28 are identical. However, the pre-focus and post-focus sections of the plate are of different thicknesses; the former being preferably 1/16 of an inch in thickness and the latter being ¼ of an inch in thickness. The disk 28 consequently comprises a focus delay plate having alternating sections of different focus delay characteristics. When properly positioned with respect to the beam splitter 24, an image in sharp focus will cast a beam through the plate 28 and incident to the detector 30 having identical out-of-focus characteristics for all quadrants of the disk 28. In other words, with reference to FIG. 1, the conductance of the photocell 30 will be of equal value on opposite sides of the minimum point of the fall off curve when the image is focused since, within the area of fall-off of the curve, points equidistant from the minimum along the abscissa have equal ordinant values. It is this characteristic which is utilized for achieving the focusing technique. It should be readily apparent that when the out-of-focus characteristics of the pre-focus quadrants of the plate 28 are equivalent to those of the post-focus quadrants then the output of the summer 48 will be zero and consequently the output of the DC integrator 50 will be at a steady level indicating that the image is at its best focus.

Figure 4:
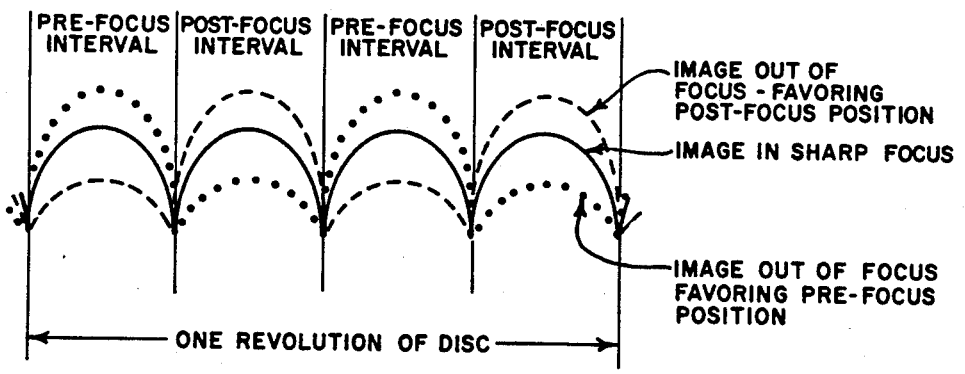
FIG. 4 is a response curve showing the output of the photoconductive cell utilized in the structure of FIG. 2.

It should of course be readily understood that when the image is out of focus an unbalance will occur between the signal coming from the peak detectors 38,40 to the summer 48 and consequently an appropriate servo control signal will be emitted from the DC integrator 50 to adjust either the lens system or object plane in the normal manner. As is shown in FIG. 4, the dotted lines indicate an image which is out-of-focus and favors the pre-focus position while the dashed lines represent a signal from the detector 30 which correlates with an image which is out of focus and favors the post-focus position. The solid line, which is of equal magnitude for both the pre-focus and post-focus interval, is indicative of an image which is in sharp focus. The effect of these signals upon the summer 48, integrator 50, and consequently the lens servo control circuitry should be readily appreciated.

Thus it can be seen that the objects of the invention have been achieved by the structure presented hereinabove. While in accordance with the Patent Statutes only the best mode and preferred embodiment of the invention has been presented and described in detail it is to be understood that the invention is not limited thereto or thereby. Consequently, for an appreciation of the scope and breadth of the invention reference should be had to the following claims.

What is claimed is:

1. In an image projection system having a light source for projecting an image bearing beam upon an image plane, the improvement of an automatic focusing device, comprising:

a beam splitter interposed within said image bearing beam and deflecting a portion of said beam;

a photoconductor receiving the deflected portion of said beam and creating signals indicative of image clarity;

a transparent rotating disk divided into at least two sections of different focus delay characteristics interposed between the beam splitter and the photoconductor; and first and second signal detector circuits receiving circuits from the photoconductor, the first signal detector receiving the signals when light incident to the photoconductor is received through a first section of the rotating disk and the second signal detector receiving the signals when light incident to the photoconductor is received through a second section of the rotating disk, the detector circuits being connected to a summing circuit producing an output indicative of the relative amplitudes of the signals incident to the signal detector circuits, the transmission of signals to the respective signal detectors being controlled by a chopper circuit receiving signals from synchronized pulse markers on the rotating disk.

2. The improvement of an automatic focusing device as recited in claim 1 wherein the two sections of the disk are of different thicknesses.

3. The improvement of an automatic focusing device as recited in claim 1 wherein the chopper circuit causes the signal detector circuits to operate in a mutually exclusive manner and in synchronization with the rotational speed of the rotating disk.

4. The improvement of an automatic focusing device as recited in claim 1 wherein the output of the summing circuit is applied to a D.C. integrator, the output of which is an error signal which is adaptable for application to a servomotor for adjustment of the image projection system to obtain a more accurate focus than that which resulted in the error signal.

5. The improvement of a focusing device as recited in claim 1 wherein the delay disk is divided into four sections, two sections of a first thickness and two sections of a second thickness.

6. The improvement of a focusing device as recited in claim 1 which further includes an A.C. coupled amplifier, filter circuit, and an automatic gain control amplifier interconnected between the photoconductor and peak detectors.

7. The improvement of a focusing device as recited in claim 1 which further includes error signal generating means comprising a summing circuit feeding a D.C. integrator.

* * * * *